Oct. 7, 1930.   W. M. EDWARDS   1,777,464
ROTARY VALVE MECHANISM
Filed Aug. 10, 1929   2 Sheets-Sheet 1
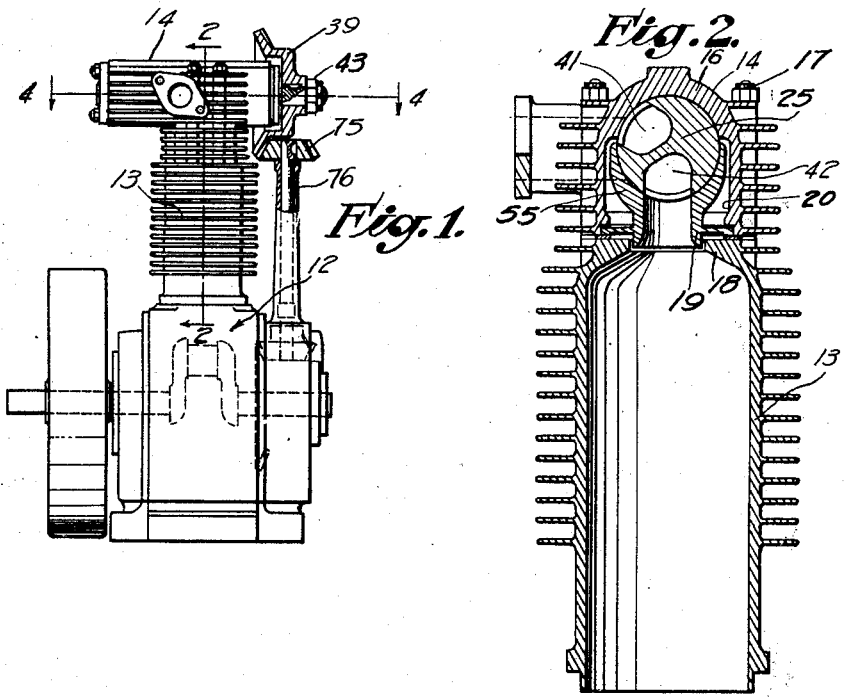
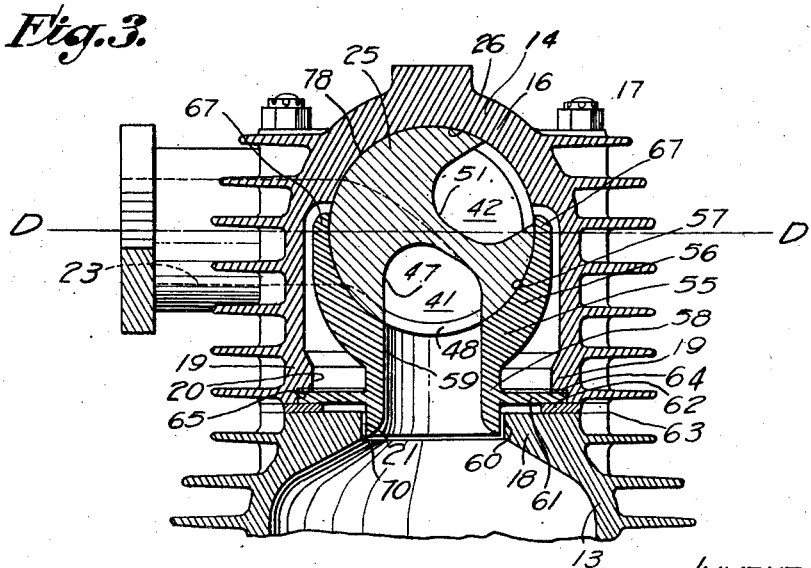
INVENTOR:
William M. Edwards;
BY
ATTORNEY Oct. 7, 1930.   W. M. EDWARDS   1,777,464
ROTARY VALVE MECHANISM
Filed Aug. 10, 1929   2 Sheets-Sheet 2
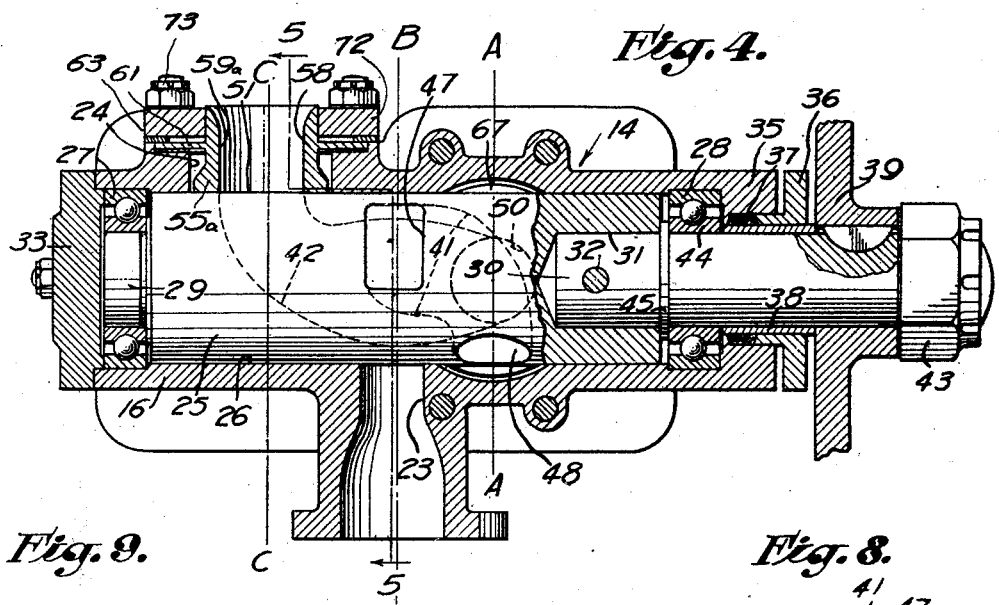
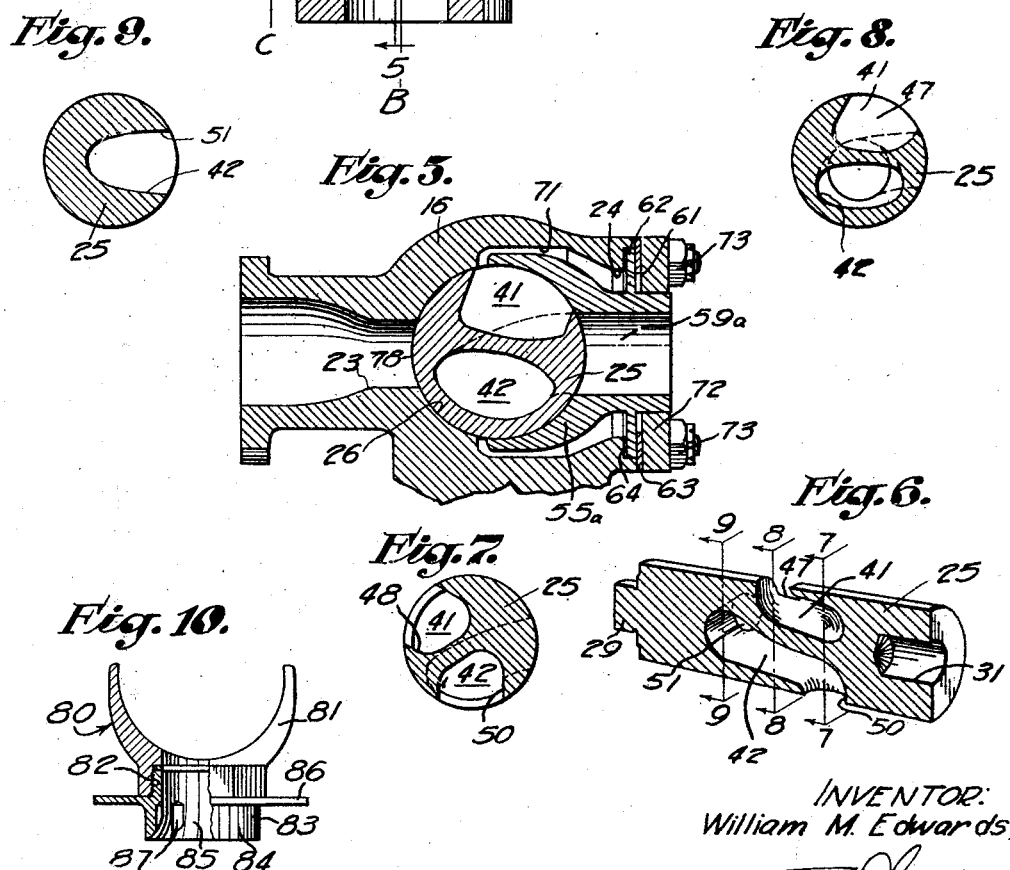
INVENTOR:
William M. Edwards,
BY
ATTORNEY.

Patented Oct. 7, 1930

1,777,464

UNITED STATES PATENT OFFICE

WILLIAM M. EDWARDS, OF LOS ANGELES, CALIFORNIA, ASSIGNOR TO ADDISON INVESTMENT COMPANY, OF LOS ANGELES, CALIFORNIA, A CORPORATION OF CALIFORNIA

ROTARY-VALVE MECHANISM

Application filed August 10, 1929. Serial No. 385,026.

This invention relates to rotary valve engines and more particularly to a new form of rotary valve mechanism suitable for use with engines of this character.

It is an object of the invention to provide a valve mechanism having a movable valve member which may be moved within a valve casing so as to alternately connect sets of ports in the valve casing, and to provide a novel form of sealing means for preventing leakage around the valve openings.

A further object of the invention is to provide a valve casing having a cylindrical bore with ports communicating with said bore, a rotary valve member supported on anti-friction bearings in the bore of the valve casing so as to rotate therein without pressure contact with the cylindrical bore of the casing, and a sealing member situated in a port of the casing so as to engage the face of the rotary valve member in such a manner as to seal between the port and the rotary valve member.

A further object of the invention is to provide a novel means for sealing between the periphery of the sealing member and the walls forming the port in which said sealing member is held.

A further object of the invention is to provide a sealing member with a laterally extending resilient diaphragm which will close the space around the sealing member in the port wherein such sealing member operates, and which diaphragm is adapted to be flexed so as to cause a pressure engagement between the sealing member and the movable valve member with which it makes frictional contact.

A further object of the invention is to provide a rotor form of valve member of sufficient strength to withstand the bending effects of pressure exerted thereagainst and to support this rotor on anti-friction bearings in such position that it will not make pressure contact with the walls of the casing within which it operates.

Further objects and advantages will appear throughout the following part of the specification.

Referring to the drawings which are for illustrative purposes only,

Fig. 1 is a simple elevational view of an engine having a valve mechanism embodying the principles of my invention.

Fig. 2 is an enlarged cross section on a plane represented by the line 2—2 of Fig. 1 showing the valve mechanism in exhaust position.

Fig. 3 is an enlarged cross section on a plane represented by the line 2—2 of Fig. 1, showing the upper portion of the engine cylinder and valve mechanism, and showing the movable member of the valve mechanism in intake position.

Fig. 4 is an enlarged cross section on a horizontal plane represented by the line 4—4 of Fig. 1, showing the valve member in exhaust position.

Fig. 5 is a section taken as indicated by the line 5—5 of Fig. 4.

Fig. 6 is a perspective view showing the rotary valve member of the invention in cross section.

Fig. 7 is a cross section on the plane represented by the line 7—7 of Fig. 6.

Fig. 8 is a cross section on the plane represented by the line 8—8 of Fig. 6.

Fig. 9 is a cross section on the plane represented by the line 9—9 of Fig. 6.

Fig. 10 is a partly sectioned elevational view showing an alternative form of sealing member which may be employed in the practice of the invention.

Although the invention may be employed with various types of engines wherein a fluid under pressure is employed as a power medium, I have, for the purpose of disclosing my invention in simple form, shown in Fig. 1 a single cylinder gas engine 12 having a cylinder 13 with a valve mechanism 14 situated at its upper end. As shown in greater detail in Figs. 2, 3, and 4, this valve mechanism includes a valve casing 16 which is secured by bolts 17 to the upper end of the cylinder 13 in such position that the upper walls 18 of the cylinder 13 will cooperate with walls 19 forming a recess 20 in the valve casing 16 to provide, as shown in Fig. 3, an opening communicating between the interior of the cylinder 13 and the interior of the valve casing 16, which opening will be hereinafter referred to as a cylinder port 21.

In Fig. 4, the vertical plane of the zone in which the cylinder port 21 lies is indicated by the line A—A. On planes of the zone B—B and C—C an intake port 23 and exhaust port 24 are respectively located. A cylindrical rotary valve member 25 is supported axially within the bore 26 of the casing 16 by means of anti-friction bearings 27 and 28 which are held in the ends of the bore 26. The leftward end of the valve member 25 has a cylindrical projection 29 which fits into the bearing member 27, and the rightward end of the rotary valve member 25 is provided with a pin or shaft 30 which is pressed into a recess or counterbore 31 in the rightward end of the member 25 and is secured therein by a pin 32.

The leftward end of the bore 26 is closed by a cover plate 33 which also serves to hold the bearing member 27 in place, and the rightward end of the bore 26 is provided with a plate member 35 having a bore therein through which the shaft 30 extends and being equipped with a gland member 36 for compressing packing 37 around a sleeve 38 which surrounds that portion of the shaft 30 between the bearing member 28 and a gear 39 which is keyed onto the end of the shaft 30 for the purpose of imparting the necessary movement to the valve member 25 to cause consecutive engagement between passages 41 and 42 of the valve member 25 and the ports of the valve casing 16. The gear 39 may be secured on the outer end of the shaft 30 by means of a nut 43 which forces the gear 39, the sleeve 38, and the inner portion 44 of the bearing member 28 tightly against a flange or shoulder 45 on the shaft 30 adjacent to the rightward end of the valve member 25.

The valve passage 41 has an inlet opening 47 which is situated in such a position as to rotate in the plane B—B of Fig. 4 when the valve member 25 is rotated. From the inlet opening 47 the intake passage 41 extends rightwardly within the valve member 25 and then bends laterally to an outlet opening 48 lying in the zone of plane A—A. The passage 42 has an inlet opening 50 lying in the zone of plane A—A in a position adjacent to the outlet opening 48 of the passage 41 and extends leftwardly from the inlet opening 50 within the valve member 25 and then bends laterally to an outlet opening 51 lying in the zone of plane C—C.

The intake and exhaust passages 41 and 42 are cored in the valve member 25 during the casting thereof, thereby enabling the valve member 25 to be made of a single integral structure having ample strength to resist severe bending stresses so as to prevent the member 25 from being forced into frictional contact with the walls forming the bore 26 of the valve casing 16. The bearing members 27 and 28 are of such character and size that the valve member 25 is thereby held in axial alignment with the bore 26. In the practice of the invention it is preferable to allow a slight clearance between the member 25 and the bore 26, which clearance may be as great as ten or fifteen thousandths of an inch without affecting the operation of the valve mechanism.

As especially pointed out in Fig. 3, a sealing member 55 is located in the recess 20 which forms part of the cylinder port 21. This sealing member 55 includes a semi-cylindrical body 56 provided with a curved face 57 adapted for engagement with the exterior of the valve member 25, and a laterally projecting cylindrical wall 58 through which an opening 59 extends from substantially the center of the curved face 57 to communication with the interior of the cylinder 13.

The upper wall 18 of the cylinder 13 is constricted, as indicated at 60, so as to fit closely around the end of the cylindrical wall 58 of the sealing member, and extending laterally from the wall 58 is a flange or thin wall forming a diaphragm 61, the periphery 62 of which is gripped between filler or gasket rings 63 placed on the upper end of the cylinder 13 and a shim ring 64 which rests in a counterbore 65 positioned to receive the periphery 62 of the diaphragm portion 61 of the sealing member 55. Ends 67 of the semi-cylindrical wall portion 56 project above the diametral plane D—D, indicated in Fig. 3, so that the curved surface 57 of the sealing member 55 extends over half the circumference of the valve member 25 and is sufficient to entirely seal either one of the openings 48 or 50 when the other is in communication with the passage or opening 59 of the sealing member 55. The upper wall 18 of the cylinder 13 may fit tightly around the lower end of the cylindrical wall 58 or a small space 70 may be left therebetween, as desired.

In the practice of the invention, we prefer to make the shim 64 of such thickness that when the casing 16 is clamped onto the upper end of the cylinder 13 the periphery 62 of the diaphragm 61 will be flexed upwardly, with the result that the face 57 of the sealing member 55 will be resiliently held in engagement with the valve member 25, thereby forming a practical and efficient seal between the valve member 25 and the opening or port 21 which leads into the cylinder 13.

It will be recognized that as wear takes place between the member 25 and the sealing member 55 the thickness of the shim 64 may be decreased so as to give a desired pressure of the sealing member 55 against the valve member 25. During the existence of pressure within the cylinder 13, the sealing member 55 will be forced upwardly into tighter engagement with the valve member 25; therefore, during the operation of the valve mechanism a tight seal is assured during the periods in which pressure exists within the cylinder 13.

As shown in Figs. 4 and 5, the exhaust port 24 is joined with a recess 71 which receives a sealing member 55ª having the same characteristics as the sealing member 55, but serving to seal between the exhaust port 24 and the valve member 25. The sealing member 55ª has an exhaust opening 59ª therein and is equipped with a circular web or diaphragm 61, the periphery 62 of which is held between a shim 64 and gasket rings 63 which are held in place by a clamping ring 72 secured in place by bolts or studs 73. It is not though necessary to provide a sealing means in the intake port 23 for the reason that in a gas engine such as that with which the invention is illustrated the intake port is not under pressure; therefore there is no tendency for leakage between the inner end of the intake port 23 and the valve member 25. In addition to this, the sealing means 55 and 55ª seal off one or more openings of the passages 41 and 42 when either of these passages 41 or 42 is disposed in position communicating with the cylinder or exhaust ports.

The valve member 25 may be rotated, or moved, either continuously or intermittently, as desired. In Fig. 1 I have shown the gear 39 engaged by a pinion 75 which is located on the upper end of a timing shaft 76, it being understood that this timing shaft 76 has a definite movement relative to the cycles of the movement of the movable parts of the engine 12. In Fig. 3 the valve member 25 is shown in such position that the valve passage 51 communicates between the intake port 23 and the opening 59 which the sealing member 55 provides through the cylinder port 21. This position of the valve member 25 occurs during the intake stroke of the piston. During the compression and power strokes of the piston the intermediate wall portion 78 of the valve member 25 is in position to close the opening 59 which communicates with the cylinder 13 through the cylinder port 21. In Figs. 2, 4, and 5, the exhaust passage 42 of the valve member 25 is shown in a position communicating between the opening 59 of the sealing member 55 and the opening 59ª of the sealing member 55ª. This position of the exhaust passage 42 occurs during the exhaust stroke of the piston and permits the combustion products to escape freely into the open atmosphere or into such exhaust piping as may be provided. It will be perceived that the sealing members 55 and 55ª tightly close both ends of the exhaust passage 42 so as to prevent leakage of combustion products or burnt gases through the small space existing between the exterior of the valve member 25 and the bore 26 of the valve casing into the intake port 23 and the intake passage 41, thereby preventing contamination of the fuel mixture by burnt gases.

Although I have shown two sealing members of the type specifically described at 55, it is to be understood that in the practice of the invention one or more sealing members of this character may be employed, as desired.

By supporting the valve member 25 so that it rotates in a definite axial position within the bore 26 of the valve casing 16 without pressure contact with the wall forming such bore, friction between the valve member 25 and the stationary parts is maintained at a minimum, but this freedom of rotation which is given the valve member 25 does not in any way sacrifice the efficiency of the seal between the valve member, its valve passages 41 and 42, and the ports with which such valve passages communicate, for the reason that an efficient and positive seal is at all times provided by the resiliently applied sealing members 55 and 55ª. I have previously described the sealing members 55 and 55ª as integrally formed from a durable metal such as steel, but it is to be understood that in the practice of the invention it is not necessary to construct the sealing members integral, as these sealing members may be conveniently assembled from cooperative parts.

In Fig. 10 I show a sealing member 80 including a semi-cylindrical body 81 adapted to engage a rotary valve member such as indicated at 25. The body 81 may be made of a metal such as gunite having exceptional wearing qualities. Into a threaded opening 82 in the member 81 is screwed a diaphragm member 83 consisting of a body 84 having a central opening 85 therethrough and a laterally extending web or diaphragm wall 86. The member 83 may be made of a metal of resilient characteristics, such as steel. In the inner circular face of the body portion 84 I show notches 87 which may be engaged by a wrench for the purpose of screwing the member 83 into tight engagement with the member 81.

I have herein shown my invention in simple and practical form, but it is recognized that certain parts or elements thereof are representative of other parts, elements, or mechanisms which may be employed in substantially the same manner to accomplish substantially the same results; therefore, it is to be understood that the invention shall not be limited to the details disclosed but shall have the scope of the following claims.

I claim as my invention:

1. A rotary valve mechanism of the character described, including: a casing having intake, exhaust, and cylinder ports; a rotary valve supported to rotate on a defined axis within said casing and substantially without pressure contact with the walls of said casing; there being passages in said rotary valve for cooperation with said ports; a diaphragm secured in each said cylinder port and said exhaust port; a sealing member held by each of said diaphragms in position to respectively seal between said cylinder port and said rotary valve and between said exhaust port and said rotary valve; means for flexing one of said diaphragms in the direction of said rotary valve; and means for imparting a required rotary motion to said rotary valve.

2. A rotary valve mechanism of the character described, including: a casing having intake, exhaust, and cylinder ports, each of which lies in a separate zone; a rotary valve supported to rotate on a defined axis within said casing and substantially without pressure contact with the walls of said casing, there being an intake and an exhaust passage in said rotary valve, said intake passage having one end in the zone of said cylinder port and its other end in the zone of said intake port, and said exhaust passage having one end in the zone of said cylinder port and its other end in the zone of said exhaust port; an upward flexing diaphragm secured in said cylinder port; a sealing member held by said diaphragm in position to seal between said cylinder port and said rotary valve; and means for imparting a required rotary motion to said rotary valve.

3. A rotary valve mechanism of the character described, including: a casing having intake, exhaust, and cylinder ports, each of which lies in a separate zone; a rotary valve supported to rotate on a defined axis within said casing and substantially without pressure contact with the walls of said casing, there being an intake and an exhaust passage in said rotary valve, said intake passage having one end in the zone of said cylinder port and its other end in the zone of said intake port, and said exhaust passage having one end in the zone of said cylinder port and its other end in the zone of said exhaust port; an upward flexing diaphragm secured in said cylinder port a second diaphragm secured in said exhaust port; a sealing member held by each of said diaphragms in position to respectively seal between said cylinder port and said rotary valve and between said exhaust port and said rotary valve; and means for imparting a required rotary motion to said rotary valve.

4. A rotary valve mechanism of the character described, including: a casing having intake, exhaust, and cylinder ports, each of which lies in a separate zone; a rotary valve within said casing, there being an intake and an exhaust passage in said rotary valve, said intake passage having one end in the zone of said cylinder port and its other end in the zone of said intake port, and said exhaust passage having one end in the zone of said cylinder port and its other end in the zone of said exhaust port; a diaphragm secured in said cylinder port; a sealing member held by said diaphragm in position to seal between said cylinder port and said rotary valve; means for flexing said diaphragm in the direction of said rotary valve; and means for imparting a required rotary motion to said rotary valve.

5. A rotary valve mechanism of the character described, including: a casing having intake, exhaust, and cylinder ports, each of which lies in a separate zone; a rotary valve within said casing, there being an intake and an exhaust passage in said rotary valve, said intake passage having one end in the zone of said cylinder port and its other end in the zone of said intake port, and said exhaust passage having one end in the zone of said cylinder port and its other end in the zone of said exhaust port; bearing members supporting said rotary valve to rotate within said casing without pressure contact with the walls of said casing; a diaphragm secured in each said cylinder port and said exhaust port; a sealing member held by each of said diaphragms in position to respectively seal between said cylinder port and said rotary valve and between said exhaust port and said rotary valve; means for flexing said diaphragms in the direction of said rotary valves; and means for imparting a required rotary motion to said rotary valve.

6. A rotary valve mechanism of the character described, including: a casing having intake, exhaust, and cylinder ports, each of which lies in a separate zone; a rotary valve within said casing, there being an intake and an exhaust passage in said rotary valve, said intake passage having one end in the zone of said cylinder port and its other end in the zone of said intake port, and said exhaust passage having one end in the zone of said cylinder port and its other end in the zone of said exhaust port; anti-friction bearing members supporting said rotary valve to rotate within said casing without pressure contact with the walls of said casing; an upward flexing diaphragm secured in said cylinder port; a sealing member held by said diaphragm in position to seal between said cylinder port and said rotary valve; and means for imparting a required rotary motion to said rotary valve.

7. A rotary valve mechanism of the character described, including: a casing having intake, exhaust, and cylinder ports; a movable valve member within said casing, there being passage means in said movable valve member for cooperation with said ports; a sealing member cooperative with said cylinder port, said sealing member having a face engaging the surface of said valve member, a passage therethrough for communication with an end of said passage means, and a resilient web extending from said sealing member; means for flexing said web upwardly in a manner to hold said sealing member in contact with said valve member; and means for imparting operating movement to said valve member.

8. A rotary valve mechanism of the character described, including: a casing having intake, exhaust, and cylinder ports; a movable valve member within said casing, there being passage means in said movable valve member for cooperation with said ports; a sealing member cooperative with said cylinder port, said sealing member having a face engaging the surface of said valve member, a passage therethrough for communication with an end of said passage means, and a diaphragm wall of resilient material extending from said sealing member; means for securing the peripheral edge of said diaphragm wall to the walls of said cylinder port and for flexing same upwardly; and means for imparting operating movement to said valve member.

9. A rotary valve mechanism of the character described, including: a casing having intake, exhaust, and cylinder ports; a movable valve member within said casing, there being passage means in said movable valve member for cooperation with said ports; a sealing member cooperative with said cylinder port, said sealing member having a face engaging the surface of said valve member, a passage therethrough for communication with an end of said passage means, and a diaphragm wall of resilient material extending from said sealing member; means for securing the peripheral edge of said diaphragm wall to the walls of said cylinder port in such position that an upward flexure will be exerted on said diaphragm wall to force said sealing member into contact with said valve member; and means for imparting operating movement to said valve member.

10. A rotary valve mechanism of the character described, the combination of: a casing having intake, exhaust, and cylinder ports; a movable valve member in said casing, there being passage means in said valve member for cooperating with said ports; a sealing member operative in said cylinder port having an opening for communication with said passage means and having a sealing face for engaging said valve member, said sealing face being of sufficient area and so disposed as to cover completely that portion of the mouth of said passage means not in communication with said opening in said sealing member, when said mouth is at least partly in communication with said opening in said sealing member; a flexible web fixed to and extending outwardly from said sealing member; and means for causing said web to flex upwardly to hold said sealing member in contact with said valve member.

11. A rotary valve mechanism of the character described, the combination of: a casing having intake, exhaust, and cylinder ports; a movable valve member in said casing, there being passage means in said valve member for cooperating with said ports; a sealing member operative in one of said ports having an opening for communication with said passage means and having a sealing face for engaging said valve member, said sealing face being of sufficient area and so disposed as to cover completely that portion of the mouth of said passage means not in communication with said opening in said sealing member, when said mouth is at least partly in communication with said opening in said sealing member; a flexible web fixed to and extending outwardly from said sealing member; and means for causing said web to flex upwardly to hold said sealing member in contact with said valve member.

12. A rotary valve mechanism of the character described, the combination of: a casing having a pair of ports; a valve member in said casing having a clearance space therearound and having a passage formed therethrough with a mouth at each end for communication with said ports; a pair of sealing members, one being located in each of said ports, each sealing member having an opening for communication with said passage means and having a sealing face for engaging said valve member, said sealing face being of sufficient area and so disposed that when one of said mouths is partly in communication with said opening in said sealing member, the remaining part of said mouth is covered by said sealing face; a flexible web extending from each of said sealing members; and means for flexing said webs in the direction of said valve member to hold said sealing members in engagement with said valve member.

13. A rotary valve mechanism of the class described, the combination of: a casing having intake, exhaust, and cylinder ports, said cylinder port connecting the interior of said casing and a cylinder in which a piston is operable; a valve member operable in said casing, said valve member having passage means; a sealing member in said cylinder port, said sealing member having a sealing face engaging said valve member, and having an opening therethrough through which gases may pass from said cylinder to said passage means; an upwardly flexing diaphragm fixed to and extending outwardly from said sealing member; and means for securing the periphery of said diaphragm to said casing.

14. A rotary valve mechanism of the class described, the combination of: a casing having intake, exhaust, and cylinder ports, said cylinder port connecting the interior of said casing and a cylinder in which a piston is operable; a valve member operable in said casing, said valve member having passage means; a sealing member in said cylinder port, said sealing member having a sealing face engaging said valve member, and having an opening therethrough through which gases may pass from said cylinder to said passage means; an upwardly flexing diaphragm extending outwardly from said sealing member; and means for securing the periphery of said diaphragm to said casing, said diaphragm forming a seal around said sealing member so that the only communication between said cylinder and said passage means is through said opening in said sealing member.

15. A rotary valve mechanism of the class described, the combination of: a casing having intake, exhaust, and cylinder ports, said cylinder port connecting the interior of said casing and a cylinder in which a piston is operable; a valve member operable in said casing, said valve member having passage means; a sealing member in said cylinder port, said sealing member having a sealing face engaging said valve member, and having an opening therethrough through which gases may pass from said cylinder to said passage means; a diaphragm extending outwardly from said sealing member; and means for securing the periphery of said diaphragm to said casing, the lower surface of said diaphragm being exposed to cylinder pressure around the lower end of said sealing member.

16. A rotary valve mechanism of the character described, including: a casing having intake, exhaust, and cylinder ports, each of which lies in a separate zone; a rotary valve supported to rotate on a defined axis within said casing and substantially without pressure contact with the walls of said casing, there being separate intake and exhaust passages in said rotary valve, said intake passage having one end in the zone of said cylinder port and its other end in the zone of said intake port, and said exhaust passage having one end in the zone of said cylinder port and its other end in the zone of said exhaust port; an upwardly flexing diaphragm secured in said cylinder port; a sealing member held by said diaphragm in position to seal between said cylinder port and said rotary valve, said sealing member having a sealing face of sufficient area and so disposed that when one mouth of one of said passages is partly in communication with said opening in said sealing member, the remaining part of said mouth is covered by said sealing face; and means for imparting a required rotary motion to said rotary valve.

17. A rotary valve mechanism of the class described, the combination of: a casing having intake, exhaust, and cylinder ports, said cylinder port connecting the interior of said casing and a cylinder in which a piston is operable; a valve member operable in said casing, said valve member having passage means; a sealing member in said cylinder port, said sealing member having a sealing face engaging said valve member, and having an opening therethrough through which gases may pass from said cylinder to said passage means; a diaphragm extending outwardly from said sealing member; and means for securing the periphery of said diaphragm to said casing, the portion of said sealing member through which gases pass from said cylinder to said passage means being spaced from the upper wall of said cylinder whereby the lower surface of said diaphragm may be exposed to cylinder pressure around the lower end of said sealing member.

18. In combination with a port of a valve casing containing a rotary valve, a sealing member in said port having a sealing face engaging said valve and an opening therethrough, a diaphragm extending outwardly from said sealing member, means for securing the periphery of said diaphragm to said casing, and means for flexing said diaphragm in the direction of said valve to thereby hold said sealing face in contact with said valve.

19. In combination with the cylinder port of a valve casing containing a rotary valve, a sealing member in said port having a sealing face engaging said valve and an opening therethrough communicating with a cylinder, a diaphragm extending outwardly from said sealing member, means for securing the periphery of said diaphragm to said casing, and means for flexing said diaphragm upwardly in the direction of said valve to thereby hold said sealing face in contact with said valve.

20. In combination with the cylinder port of a valve casing containing a rotary valve, a sealing member in said port having a sealing face engaging said valve and an opening therethrough communicating with a cylinder, a diaphragm extending outwardly from said sealing member and exposed to cylinder pressure on its lower side, and means for securing the periphery of said diaphragm to said casing in such a manner that said diaphragm forms a seal around said sealing member whereby communication from said cylinder to said casing is afforded only through said opening.

21. In combination with the cylinder port of a valve casing containing a rotary valve, a sealing member in said port having a sealing face engaging said valve and an opening therethrough communicating with a cylinder, a diaphragm extending outwardly from said sealing member, means for securing the periphery of said diaphragm to said casing in such a manner that said diaphragm forms a seal around said sealing member whereby communication from said cylinder to said casing is afforded only through said opening, and means for flexing said diaphragm upwardly in the direction of said valve to thereby hold said sealing face in contact with said valve.

22. In combination with the cylinder port of a valve casing containing a rotary valve, a sealing member in said port having a sealing face engaging said valve and an opening therethrough communicating with a cylinder, a diaphragm extending outwardly from said sealing member, means for securing the periphery of said diaphragm to said casing, means for flexing said diaphragm upwardly in the direction of said valve to thereby hold said sealing face in contact with said valve, the lower surface of said diaphragm being exposed to cylinder pressure around the lower end of said sealing member.

23. A rotary valve mechanism of the class described, the combination of: a casing having intake, exhaust, and cylinder ports, said cylinder port connecting the interior of said casing and a cylinder in which a piston is operable; a valve member operable in said casing, said valve member having passage means; a sealing member in said cylinder port, said sealing member having a sealing face engaging said valve member, and having an opening therethrough through which gases may pass from said cylinder to said passage means; a diaphragm extending outwardly from said sealing member; and means for securing the periphery of said diaphragm to said casing, said diaphragm forming a seal around said sealing member so that the only communication between said cylinder and said passage means is through said opening in said sealing member, and means for flexing said diaphragm in the direction of said valve member.

24. As a new article of manufacture, a sealing member for a valve mechanism comprising: a body having a sealing face and an opening connected to said sealing face and to another side of said body; and an upward flexing diaphragm fixed to and extended outward from said body.

25. In combination with a port of a valve casing containing a rotary valve, a sealing member having a sealing face engaging said valve and a wall portion extending through said port, an opening through said sealing face and wall portion, said wall portion being movable in said port, a flexible diaphragm extending outwardly from said wall portion and constituting the only support for said sealing member, and means for securing the periphery of said diaphragm to said casing.

26. As a new article of manufacture, a sealing member for a valve mechanism comprising a body having a sealing face and a wall portion projecting from said face, said body being provided with an opening through said face and wall portion, and a diaphragm extending outwardly from said wall portion.

27. As a new article of manufacture, a sealing member for a valve mechanism comprising a body having a sealing face and a wall portion projecting from said face, said body being provided with an opening through said face and wall portion, and a diaphragm extending outwardly from said wall portion at a point intermediate the ends of said wall portion.

In witness whereof, I have hereunto set my hand at Los Angeles, California, this 18th day of July, 1929.

WILLIAM M. EDWARDS.